United States Patent
Followell et al.

(10) Patent No.: US 10,583,927 B2
(45) Date of Patent: Mar. 10, 2020

(54) SYSTEMS AND METHODS FOR MONITORING AN AIR TREATMENT ASSEMBLY OF A VEHICLE

(71) Applicant: THE BOEING COMPANY, Chicago, IL (US)

(72) Inventors: David Allan Followell, Wildwood, MO (US); Eric Lee Nicks, O'Fallon, MO (US); Javier Cortez, Glen Carbon, IL (US)

(73) Assignee: The Boeing Company, Chicago, IL (US)

( * ) Notice: Subject to any disclaimer, the term of this patent is extended or adjusted under 35 U.S.C. 154(b) by 1028 days.

(21) Appl. No.: 14/510,305

(22) Filed: Oct. 9, 2014

(65) Prior Publication Data

US 2016/0101665 A1    Apr. 14, 2016

(51) Int. Cl.
*B64D 13/06* (2006.01)
*B01D 46/44* (2006.01)
*B01D 46/00* (2006.01)

(52) U.S. Cl.
CPC ......... *B64D 13/06* (2013.01); *B01D 46/0086* (2013.01); *B01D 46/446* (2013.01)

(58) Field of Classification Search
CPC .................. B01D 46/0086; B01D 46/444; B01D 46/446; B64D 13/06
See application file for complete search history.

(56) References Cited

U.S. PATENT DOCUMENTS

| | | | |
|---|---|---|---|
| 5,012,646 A | 5/1991 | Speer | |
| 7,198,037 B2 | 4/2007 | Sayers | |
| 7,922,914 B1 * | 4/2011 | Verdegan | B01D 37/046 210/741 |
| 8,029,608 B1 * | 10/2011 | Breslin | B01D 46/0086 116/212 |
| 8,974,573 B2 * | 3/2015 | Kates | F24F 3/1603 62/231 |
| 2010/0243220 A1 | 9/2010 | Geskes | |
| 2011/0180234 A1 | 7/2011 | Wickham | |
| 2011/0185895 A1 * | 8/2011 | Freen | G01N 15/08 95/25 |
| 2012/0216545 A1 | 8/2012 | Sennoun | |
| 2013/0197829 A1 * | 8/2013 | Sherman, III | B01D 46/0086 702/45 |
| 2013/0239802 A1 * | 9/2013 | Troxell | B01D 46/0086 95/20 |
| 2014/0083106 A1 | 3/2014 | Mackin | |

(Continued)

*Primary Examiner* — Robert Clemente
(74) *Attorney, Agent, or Firm* — Joseph M. Butscher; The Small Patent Law Group, LLC

(57) ABSTRACT

A system may include an air treatment assembly configured to deliver treated air to an enclosed space within a vehicle, at least one upstream sensor upstream from the air treatment assembly, and at least one downstream sensor downstream from the air treatment assembly. The upstream sensor(s) and the downstream sensor(s) are configured to detect at least one attribute of air, such as air pressure. An air treatment monitoring system is in communication with the sensors. The air treatment monitoring system receives one or more sensor signals from the sensors, and calculates an attribute differential (such as a pressure differential) based on the one or more signals.

20 Claims, 4 Drawing Sheets

(56) References Cited

U.S. PATENT DOCUMENTS

2014/0283682 A1* 9/2014 Hamann ............ B01D 46/0086 95/10
2015/0176545 A1* 6/2015 Troxell ................ F02M 35/086 55/302

* cited by examiner

SYSTEMS AND METHODS FOR MONITORING AN AIR TREATMENT ASSEMBLY OF A VEHICLE

BACKGROUND OF THE DISCLOSURE

Embodiments of the present disclosure generally relate to systems and methods for monitoring one or more air treatment assemblies of a vehicle, such as an aircraft.

Various vehicles include internal cabins in which operators and/or passengers may be seated. For example, a commercial airplane includes an internal cabin that is configured to seat hundreds of passengers. During operation of the aircraft, the temperature of the cabin is controlled so that the passengers and operator(s) are comfortable. Often, an aircraft includes an environmental control system (ECS) to control the temperature and pressure within the cabin.

A known ECS includes a heat exchanger and a fan. The heat exchanger is positioned within a duct, and the fan draws ambient air through the heat exchanger to cool treated air before it enters the cabin. For example, the heat exchanger may receive bleed air that is ported from a compressor of a vehicle engine or an electrically-drive compressor and cool the bleed air with ambient air.

Over the life of an ECS, one or more of the air treatment assemblies, such as a heat exchanger, may accumulate and retain contaminants. The retained contaminants may block or otherwise restrict airflow to a point at which thermal energy transfer is prevented, thereby leading to a failure of the assembly or system. In general, the contaminants may clog the air treatment assembly, thereby decreasing the efficiency and overall effectiveness of the ECS. Passengers and operators may become uncomfortable due to the malfunctioning ECS. Typically, a malfunctioning air treatment assembly is noticed when the temperature within a space, such as a cabin within an aircraft, becomes uncomfortable. Contaminated air treatment assemblies may also restrict air flow to such an extent that secondary equipment degradation, such as cavitation in fan air flow patterns, occurs. After it is determined by an operator that an air treatment assembly is malfunctioning, the air treatment assembly is cleaned or replaced, which may lead to the vehicle being taken out of service during the maintenance operation.

Accordingly, a need exists for monitoring an ECS, for example, to determine whether one or more components need to be replaced.

SUMMARY OF THE DISCLOSURE

Certain embodiments of the present disclosure provide a system that may include at least one air treatment assembly configured to deliver treated air to an enclosed space within a vehicle, at least one upstream sensor upstream from the air treatment assembly, and at least one downstream sensor downstream from the air treatment assembly. The upstream sensor(s) and the downstream sensor(s) are configured to detect at least one attribute of air, such as air pressure. An air treatment monitoring system is in communication with the upstream sensor(s) and the downstream sensor(s). The air treatment monitoring system receives one or more sensor signals from the upstream sensor(s) and the downstream sensor(s). The air treatment monitoring system is configured to calculate an attribute differential, such as an air pressure differential, based on the signals.

The air treatment monitoring system may be configured to calculate a compensated pressure differential based on the attribute differential and one or more parameters related to the vehicle. The air treatment monitoring system may be configured to determine an operative state of the air treatment assembly by referencing a failure threshold in relation to the attribute differential. In at least one embodiment, the air treatment monitoring system may also be configured to predict a time of failure of the air treatment assembly based on historical data of the air treatment assembly.

The attribute of the air may include air pressure. As such, the downstream sensor(s) may include at least one downstream air pressure sensor, and the upstream sensor(s) may include at least one upstream air pressure sensor.

The air treatment assembly may be or include a heat exchanger. Alternatively, the air treatment assembly may be or include a desiccant or enthalpy wheel, an air filter, a heat pump, or the like.

In at least one embodiment, the air treatment monitoring system may include a pressure differential calculation unit that is configured to calculate a pressure differential between the sensor signals received from the upstream sensor(s) and the downstream sensor(s). A parameter compensation factor determination unit may be configured to determine one or more parameter compensation factors related to the vehicle. A compensated pressure calculation unit may be configured to calculate a compensated pressure differential based on the pressure differential and the one or more compensation factors. The parameter compensation factors may relate to one or more of vehicle altitude, vehicle speed, ambient temperature, fan state, fan door position, and position of the vehicle.

In at least one embodiment, the air treatment monitoring system may include a diagnostic unit that is configured to compare the compensated pressure differential with a failure threshold to determine an operative state of the air treatment assembly. The air treatment monitoring system may also include a prediction unit that is configured to predict a failure date of the air treatment assembly by detecting a trend in stored compensated pressure differentials over time.

The air treatment monitoring system may be within the vehicle. Alternatively, the air treatment monitoring system may be remotely located from the vehicle.

Certain embodiments of the present disclosure provide a method of monitoring an air treatment assembly within a vehicle. The method may include receiving one or more air pressure signals detected by air pressure sensors that are positioned upstream and downstream from an air treatment assembly within a duct of the vehicle, and calculating a pressure differential based on the one or more air pressure signals. The method may also include calculating a compensated pressure differential based on the pressure differential and one or more parameters related to the vehicle, determining an operative state of the air treatment assembly by referencing a failure threshold in relation to the pressure differential, and/or predicting a time of failure of the air treatment assembly based on historical data of the air treatment assembly.

Certain embodiments of the present disclosure provide an air treatment monitoring system configured to monitor an operative state of an air treatment assembly within a vehicle. The air monitoring system may include a pressure differential calculation unit that is configured to calculate a pressure differential between a first sensor signal received from a first sensor that is upstream in relation to the air treatment assembly and a second sensor signal received from a second sensor that is downstream in relation to the air treatment assembly. A parameter compensation factor determination unit may be configured to determine one or more parameter compensation factors related to the vehicle. A compensated pressure calculation unit may be configured to calculate a compensated pressure differential based on the pressure differential and the compensation factor(s). A diagnostic unit may be configured to compare the compensated pressure differential with a failure threshold to determine an operative state of the air treatment assembly. A prediction unit may be configured to predict a failure date of the air treatment assembly by detecting a trend in stored compensated pressure differentials over time.

DETAILED DESCRIPTION OF THE DISCLOSURE

The foregoing summary, as well as the following detailed description of certain embodiments will be better understood when read in conjunction with the appended drawings. As used herein, an element or step recited in the singular and proceeded with the word "a" or "an" should be understood as not excluding plural of the elements or steps, unless such exclusion is explicitly stated. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Figure 1:
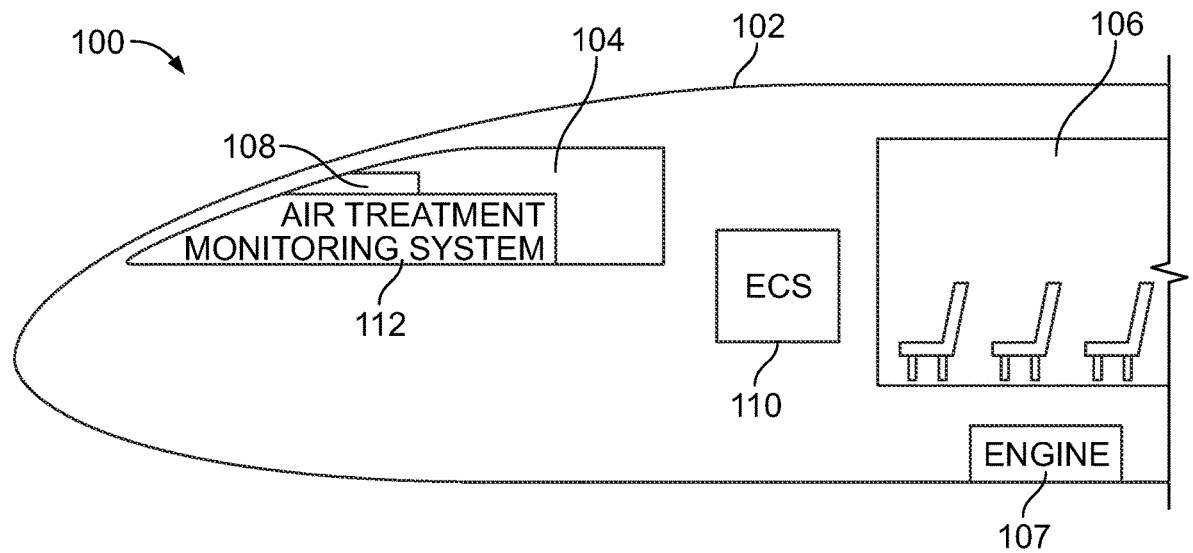
FIG. 1 illustrates a simplified block diagram of a vehicle, according to an embodiment of the present disclosure.

FIG. 1 illustrates a simplified block diagram of a vehicle 100, according to an embodiment of the present disclosure. The vehicle 100 may be an aircraft, for example. Alternatively, the vehicle 100 may be various other types of vehicles, such as land-based or water-based vehicles.

The vehicle 100 includes a main body 102, such as a fuselage, that may include a cockpit 104 and a cabin 106, and one more engines 107. The cockpit 104 includes controls 108 for operating the vehicle 100. The controls 108 may include instruments that are in communication with sensors, thermometers, altimeters, and the like that are configured to detect various parameters related to the vehicle 100, such as engine temperature, ambient air temperature, air pressure, vehicle speed, vehicle altitude, and the like.

The vehicle 100 also includes an environmental control system (ECS) 110 that is configured to provide treated air to the cabin 106 and the cockpit 104. The ECS 110 may include one or more air treatment assemblies that are configured to treat air that is delivered to an internal space, such as the cockpit 104 and the cabin 106.

An air treatment monitoring system 112 monitors one or more components of the ECS 110, such as one or more air treatment assemblies. The air treatment monitoring system 112 may be in communication with portions of the ECS through one or more sensors. For example, the air treatment monitoring system 112 may be wirelessly or wirelessly communicatively connected to one or more sensors, such as air pressure sensors, that are downstream and/or upstream of one or more components of the ECS 110. For example, the ECS 110 may include a heat exchanger that is configured to treat bleed air from a compressor of the engine 107 with ambient air. A first pressure sensor may be upstream from the heat exchanger, and a second pressure sensor may be downstream from the heat exchanger. The air treatment monitoring system 112 receives sensor signals from the pressure sensors to determine the air pressure upstream and downstream from the heat exchanger. The air treatment monitoring system 112 may determine a pressure differential between the upstream and downstream pressures to determine the efficiency and effectiveness of the ECS 110.

As shown in FIG. 1, the air treatment monitoring system 112 may be onboard the vehicle 100. Alternatively, the air treatment monitoring system 112 may be remotely located from the vehicle 100, such as at a central land-based location.

Figure 2:
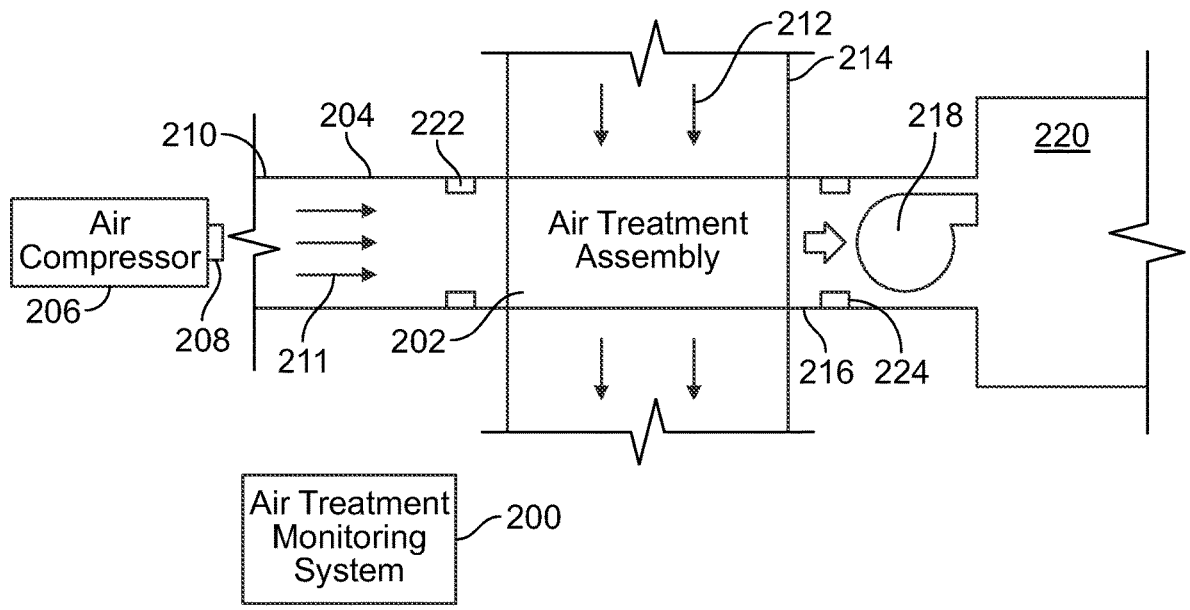
FIG. 2 illustrates a block diagram of an air treatment monitoring system monitoring an air treatment assembly of a vehicle, according to an embodiment of the present disclosure.

FIG. 2 illustrates a block diagram of an air treatment monitoring system 200 monitoring an air treatment assembly 202, such as an air treatment assembly of a vehicle, according to an embodiment of the present disclosure. The air treatment monitoring system 200 is an example of the air treatment monitoring system 112 shown and described with respect to FIG. 1.

The air treatment assembly 202 may be disposed, such as being enclosed, within a duct 204, such as a conduit, tube, pipe, or other such structure that is configured to channel air to an enclosed space. A portion of an engine may be in fluid communication with (for example, through a path that allows air to pass between) the duct 204 upstream from the air treatment assembly 202. For example, an air compressor 206 of an engine may include an air exhaust port 208 that is fluidly coupled to an inlet 210 of the duct 204. The air compressor 206 exhausts hot, compressed air 211 into the inlet 210 toward the air treatment assembly 202. For example, the air 211 from the air compressor 206 may be between 250°-300° C. at a pressure of 50 psi.

The air treatment assembly 202 also receives conditioning air 212 through an air duct 214, such as a cross-flow duct. For example, the conditioning air 212 may be ambient air that is received through an air intake device, such as a vent. The conditioning air 212 cools the exhaust air from the air compressor 206 as it passes through the air treatment assembly 202. The cooled or otherwise treated air from the air compressor 206 may be drawn through an outlet 216 of the duct 204 by one or more fans 218 and may be exhausted out of the vehicle, instead of into an internal space 220, such as a cabin and cockpit of a vehicle.

As shown, one or more sensors 222 may be positioned within the duct 204 upstream (such as within the inlet 210) from the air treatment assembly 202. Additionally, one or more sensors 224 may be positioned within the duct 204 downstream (such as within the outlet 216) from the air treatment assembly 202. The sensors 222 and 224 may be configured to detect one or more attributes of air, such as air temperature, flow rate, pressure, or the like. For example, the sensors 222 and 224 may be configured to detect air pressure. As such, the sensors 222 and 224 may be air pressure sensors.

The air treatment monitoring system 200 is in communication with the sensors 222 and 224, such as through wired or wireless connections. The air treatment monitoring system 200 receives sensor signals from the sensors 222 and 224 that relate to the attribute(s) of the detected air. Alternatively, the sensors 222 and 224 may detect attributes of the air, and store the sensor signals in a memory. The air treatment monitoring system 200 may access the memory in real time or at a later time to analyze the sensor signals, which are indicative of the sensed attributes of the air.

The air treatment monitoring system 200 analyzes the sensor signals from the sensors 222 and 224. For example, the air treatment monitoring system 200 may analyze air pressure signals detected from the sensors 222 and 224. In this manner, the air treatment monitoring system 200 may determine the air pressure at an upstream point and a downstream point in relation to the air treatment assembly 202. In doing so, the air treatment monitoring system 200 may determine an air pressure differential in relation to the areas upstream and downstream from the air treatment assembly 202. If there is little to no pressure differential, then the air treatment monitoring system 200 may determine that the air treatment assembly 202 is operating as intended (for example, a normal operating state). If, however, a pressure differential exists, the air treatment monitoring system 200 may determine that the air treatment assembly 202 is in a fault condition (for example, a degraded operating state, or a failed operating state). For example, if there is a substantial pressure drop downstream from the air treatment assembly 202 (such as when the sensors 224 detect a lower air pressure than that detected by the sensors 222), the air treatment assembly 202 may be clogged with debris and may be operating in a degraded or failed operative state. The air treatment monitoring system 200 may also collect data from the sensors 222 and 224 and analyze the received data to determine if a measured pressure differential is appropriate for current operating conditions.

Figure 3:
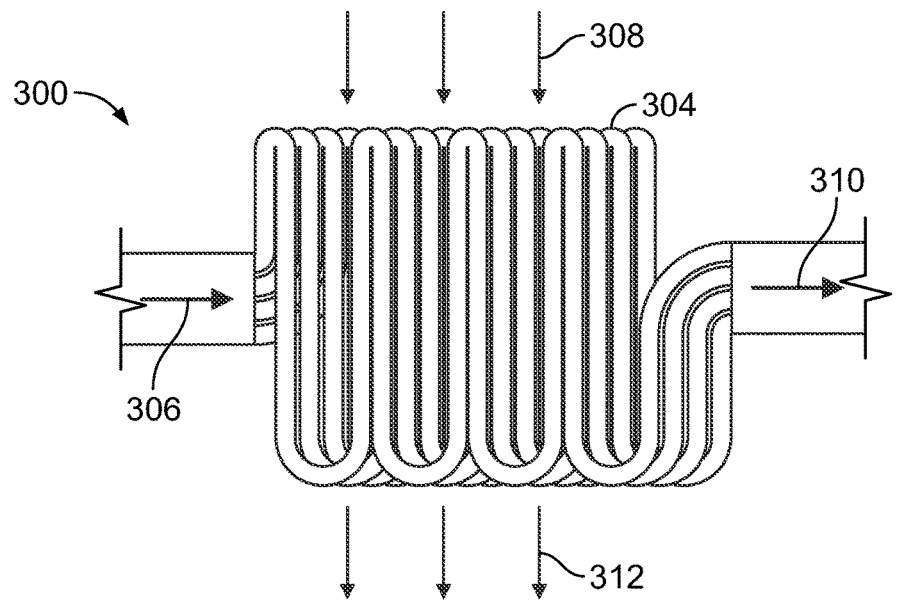
FIG. 3 illustrates a simplified diagram of an air treatment assembly, according to an embodiment of the present disclosure.

FIG. 3 illustrates a simplified diagram of an air treatment assembly 300, according to an embodiment of the present disclosure. The air treatment assembly 300 may include a heat exchanger 302 having a plurality of coils 304 that receive intake air 306, such as compressed air from an air compressor of an engine. Conditioning air 308, such as ambient air, flows over the coils 304 and conditions the air passing through the coils 304. For example, if the intake air 306 is at a first temperature that exceeds a second temperature of the ambient air 308, supply air 310 (such as that supplied to an internal space of a vehicle) is at a third temperature that is lower than the first temperature, while the exhausted conditioning air 312 is at a fourth temperature that exceeds the second temperature. Instead of coils, the heat exchanger 302 may include fins, or various other structures.

Referring again to FIG. 2, the air treatment assembly 202 may be various types of air treatment assemblies. As described, the air treatment assembly 202 may be a heat exchanger, such as a cross-flow, parallel flow, or counter-flow heat exchanger. The heat exchanger may be or include a plate heat exchanger, a coiled heat exchanger, a finned heat exchanger, or the like.

In at least one other embodiment, the air treatment assembly 202 may be or include an air filter configured to filter air of impurities. In at least one other embodiment, the air treatment assembly 202 may be or include an enthalpy wheel, a desiccant wheel, a plate energy (heat and moisture) exchanger, a heat pipe, a run-around loop, or the like. Further, the air treatment monitoring system 200 may be used with respect to one or more air treatment assemblies. For example, an ECS may include multiple air treatment assemblies, such as heat exchangers, filters, enthalpy or desiccant wheels, heat pumps, and/or the like. The air treatment monitoring system 200 may be in communication with sensors positioned with respect to the air treatment assemblies. For example, sensors may be positioned upstream and downstream of each air treatment assembly, or may optionally be upstream and downstream of a chain of air treatment assemblies.

As described above, the sensors 222 and 224 may be air pressure sensors configured to detect air pressure. Alternatively, the sensors 222 and 224 may be various other sensors configured to detect other attributes of air, such as air temperature, air flow, and/or the like.

The air treatment monitoring system 200 may be or include one or more computers, control units, circuits, or the like, such as processing devices, that may include one or more microprocessors, microcontrollers, integrated circuits, and the like. The air treatment monitoring system 200 may also include memory, such as non-volatile memory, random access memory, and/or the like. The memory may include any suitable computer-readable media used for data storage. The computer-readable media are configured to store information that may be interpreted by the air treatment monitoring system 200. The information may be data or may take the form of computer-executable instructions, such as software applications, that cause a microprocessor or other such control unit within the air treatment monitoring system 200 to perform certain functions and/or computer-implemented methods. The computer-readable media may include computer storage media and communication media. The computer storage media may include volatile and non-volatile media, removable and non-removable media implemented in any method or technology for storage of information such as computer-readable instructions, data structures, program modules or other data. The memory and/or computer storage media may include, but are not limited to, RAM, ROM, EPROM, EEPROM, or other solid state memory technology, CD-ROM, DVD, or other optical storage, magnetic cassettes, magnetic tape, magnetic disk storage or other magnetic storage devices, or any other medium which may be used to store desired information and that may be accessed by components of the air treatment monitoring system 200.

Figure 4:
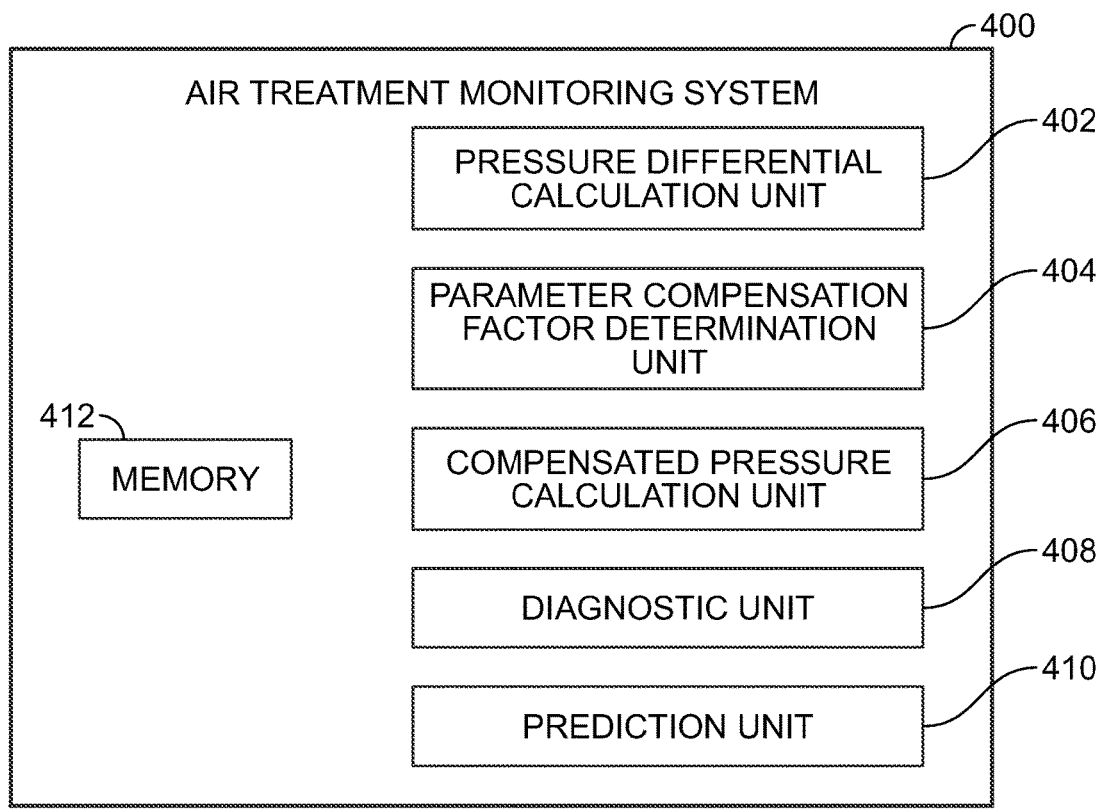
FIG. 4 illustrates a block diagram of an air treatment monitoring system, according to an embodiment of the present disclosure.

FIG. 4 illustrates a block diagram of an air treatment monitoring system 400, according to an embodiment of the present disclosure. The air treatment monitoring system 400 is an example of the air treatment monitoring system 112 and 200 shown and described with respect to FIGS. 1 and 2, respectively.

The air treatment monitoring system 400 may include a pressure differential calculation unit 402, a parameter compensation factor determination unit 404, a compensated pressure calculation unit 406, a diagnostic unit 408, a prediction unit 410, and a memory 412, all of which may be contained within a one or more computing devices, such as a computer onboard a vehicle, for example. Each of the units 402, 404, 406, 408, and 410 may be separate and distinct control units, such as one or more processors. Alternatively, each of the units 402, 404, 406, 408, and 410 may be part of a single control unit.

The pressure differential calculation unit 402 is configured to receive and analyze sensor signals detected by sensors that are positioned upstream (for example, at a position pre- or before air enters) and downstream (for example, at a position post- or after air passes through) from an air treatment assembly. For example, the sensor signals may be received from air pressure sensors that are positioned upstream and downstream from an air treatment assembly. The pressure differential calculation unit 402 analyzes the sensor signals and determines the air pressure upstream (for example, pre-air treatment assembly) and downstream (for example, post-air treatment assembly). The pressure differential calculation unit 402 then determines the difference, or differential, between the upstream and downstream sensor signals. Accordingly, the pressure differential calculation unit 402 determines a pressure differential ΔP as follows:

$$\Delta P = \text{Post Assembly Pressure} - \text{Pre Assembly Pressure}$$

where post assembly pressure is the air pressure within a duct downstream from an air treatment assembly towards an enclosed space, and pre assembly pressure is the air pressure within a duct upstream from an air treatment assembly towards an air compressor, for example.

After the pressure differential ΔP is calculated, the parameter compensation factor determination unit 404 determines one or more parameter compensation factors. The parameters may be received from a vehicle control or instrumentation system, such as controls 108 shown in FIG. 1, which is in communication with one or more sensors that are configured to detect the parameters. For example, the parameters may be or include vehicle altitude, vehicle speed, ambient air temperature, fan state, weight on wheels, fan door position, and/or the like.

Altitude affects the air pressure within a duct in which an air treatment assembly is positioned. For example, as altitude increases, air pressure decreases. The memory 412 may store various altitude compensation factors. For example, an altitude compensation factor differs for sea level and various altitudes above sea level. The parameter compensation factor determination unit 404 receives altitude data for the vehicle, such as through controls and/or instrumentation of the vehicle, and selects a matching altitude compensation factor that is stored in the memory 412.

Vehicle speed also affects the air pressure within the duct in which the air treatment assembly is positioned. For example, with increased speed, an increased pressure drop may occur within the duct. A speed compensation factor differs for a parked vehicle and one traveling at various land and/or air speeds. The parameter compensation factor determination unit 404 receives speed data for the vehicle, such as through controls and/or instrumentation of the vehicle, and selects a matching speed compensation factor that is stored in the memory 412.

Ambient air temperature also affects the air pressure within the duct in which the air treatment assembly is positioned. For example, a temperature compensation factor differs for various ambient air temperatures. The parameter compensation factor determination unit 404 receives ambient air temperature data with respect to the vehicle, such as through controls and/or instrumentation of the vehicle, and selects a matching temperature compensation factor that is stored in the memory 412.

The fan state also affects the air pressure within the duct in which the air treatment assembly is positioned. The fan may be the fan 218, shown in FIG. 2. A fan state compensation factor differs depending on whether or not the fan is operating to move air through the air treatment assembly. The parameter compensation factor determination unit 404 receives fan state data for the vehicle, such as through controls and/or instrumentation of the vehicle, and selects a matching fan state compensation factor that is stored in the memory 412.

Additionally, a fan door position, such as the position of one or more dampers proximate to the fan, also affects the air pressure within the duct in which the air treatment assembly is positioned. A fan door position compensation factor differs depending on whether or not the fan is fully opened, closed, or various positions there between. The parameter compensation factor determination unit 404 receives fan door position data, such as through controls and/or instrumentation of the vehicle, and selects a matching fan door position compensation factor that is stored in the memory 412.

The weight on wheels of the vehicle also affects the air pressure within the duct in which the air treatment assembly is positioned. For example, if a full weight of the vehicle is on the wheels, then the vehicle is grounded. However, if the wheels are supporting little to no weight of the vehicle, then the vehicle is likely airborne. A wheel weight factor differs depending on whether the vehicle is grounded or airborne. The parameter compensation factor determination unit 404 may use the weight on wheels information to determine the aircraft state and expected temperatures and pressures.

Various other parameters may be detected, and various other parameter compensation factors may be stored in the memory. The parameters relate to the vehicle, such as vehicle operation, immediate surroundings or position of the vehicle, and/or the like. In short, one or more compensation factors are functions of parametric data related to the vehicle.

After the parameter compensation factor determination unit 404 determines one or more relevant parameter compensation factors, the compensated pressure calculation unit 406 applies the parameter compensation factor(s) to the pressure differential ΔP to calculate a compensated pressure differential. For example, the compensated pressure calculation unit 406 may determine the compensated pressure differential $\Delta P_C$ as follows:

$$\Delta P_C = f(\text{Factor(s)}[\Delta P])$$

where the $\Delta P_C$ is a function of the ΔP and the one or more compensation factors, such as those described above. For example, $\Delta P_C$ may be determined by multiplying ΔP by the one or more compensation factors. In another embodiment, ΔP may be determined by dividing ΔP by the one or more compensation factors. The $\Delta P_C$ may be determined through various mathematical operations.

After the compensation pressure calculation unit 406 determines the compensated pressure $\Delta P_C$, the diagnostic unit 408 compares the compensated pressure $\Delta P_C$ to a failure threshold, which may be stored in the memory 412. For example, the failure threshold may be a preset, predetermined value (determined by an air treatment assembly manufacturer or vehicle owner or operator), such as a pressure level, past which an air treatment assembly no longer properly functions. For example, the failure threshold may be a pressure drop of 5 psi, for example. Alternatively, the failure threshold may be greater or lesser than 5 psi, depending on the nature of the air treatment assembly, and manufacturer guidelines as to acceptable pressure drops. As such, when the $\Delta P_C$ crosses the failure threshold (such as crossing above or below the failure threshold, depending on the nature of the failure threshold), the diagnostic unit 408 determines that the air treatment assembly is failing or otherwise inoperative, and an alert, such as a visual or audio alert, may be sent to the operator of the vehicle. For example, when the diagnostic unit 408 determines that the failure threshold has been crossed, the diagnostic unit 408 may send an alert signal that is shown on a display or broadcast through a speaker to an operator of the vehicle.

The diagnostic unit 408 may store compensated pressure differentials within the memory 412. The diagnostic unit 408 may match each compensated pressure differential with corresponding flight data, such as date and time of flight. The prediction unit 410 may analyze the compensated pressure differentials with corresponding flight data to determine a pressure differential trend with respect to a particular air treatment assembly. The prediction unit 410 may predict a date or time of failure of the air treatment assembly based on the analyzed trends.

Figures 5, 6:
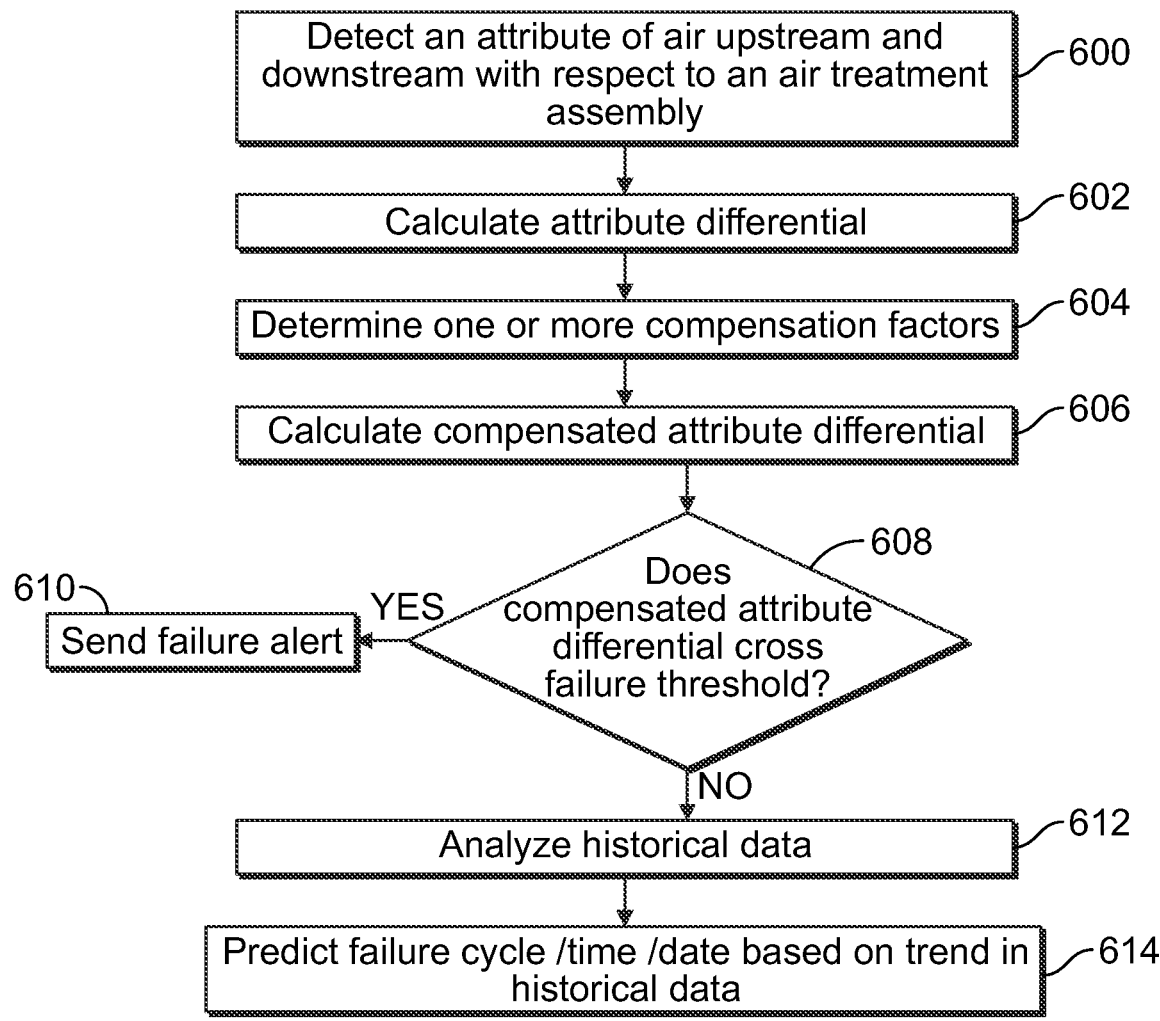
FIG. 5 illustrates a table of a pressure differential trend of an air treatment device, according to an embodiment of the present disclosure.
FIG. 6 illustrates a flow chart of a method of monitoring an air treatment assembly of a vehicle, according to an embodiment of the present disclosure.

FIG. 5 illustrates a table 500 of a pressure differential trend of an air treatment device, according to an embodiment of the present disclosure. As shown, the table 500 correlates flights 502 with compensated pressure differentials 504. Alternatively, instead of flights, the table 500 may correlate times with pressure differentials, or various other attributes of an air treatment assembly. The table 500 or data related to the table may be stored in the memory of the air treatment monitoring system.

As shown in FIG. 5, the compensated pressure differential increases by 0.5 psi with each flight. Accordingly, the prediction unit 410 may analyze the trend in relation to a failure threshold and predict when the failure threshold will be reached. For example, if the failure threshold is 5 psi, the prediction unit 410 may predict (based on the trend shown in FIG. 5) that the air treatment assembly will fail by the 11th flight.

It is to be understood that the table 500 illustrates a simplified trend. The trend may be more or less than 0.5 psi per flight or time, and may or may not be regular. For example, the trend may be an exponential or geometric trend.

Referring again to FIG. 4, the prediction unit 410 references or otherwise analyzes the stored attribute differentials, such as compensated pressure differentials, in relation to correlated uses of a vehicle, such as flights, times of use, and the like, to determine a predicted failure data, time, flight, or the like. The attribute trend is a function of historical data that may be stored within the memory 412, for example.

FIG. 6 illustrates a flow chart of a method of monitoring an air treatment assembly of a vehicle, according to an embodiment of the present disclosure. At 600, an attribute of air is detected upstream and downstream with respect to an air treatment assembly. For example, the attribute of air may be air pressure.

Next, at 602, an attribute differential, such as a pressure differential, is calculated between the air pressure downstream and the air pressure upstream of the air treatment system. At 604, one or more compensation factors may be determined. Then, at 606, a compensated attribute differential may be calculated.

At 608, it is determined whether the compensated attribute differential crosses a stored failure threshold. If so, the process continues to 610, in which a failure alert is sent, such as to a control system of the vehicle.

If, however, the compensated attribute differential does not cross the failure threshold, then at 612, historical data of the air treatment assembly is analyzed. The historical data may include stored compensated attribute differentials that are correlated with specific uses of the vehicle, such as times of use, flights, dates, and/or the like. At 614, a failure date, cycle, time, or the like may be predicted based on one or more trends that are evident in the historical data.

As described above, embodiments of the present disclosure provide systems and methods for monitoring one or more air treatment assemblies within a vehicle. Embodiments of the present disclosure provide air treatment monitoring systems that may determine the operative state of one or more air treatment assemblies by detecting and analyzing one or more attributes of air in relation to the air treatment assembl(ies). For example, in at least one embodiment, a pressure differential may be calculated with respect to air pressure before and after the air is treated by the air treatment assembl(ies). The pressure differential may be compensated by one or more parameters related to the vehicle. The air treatment monitoring system may determine whether or not the air treatment assembly is properly functioning by referencing, comparing, or otherwise analyzing a compensated pressure differential in relation to a stored failure threshold. In at least one embodiment, the air treatment monitoring system may analyze historical data of the air treatment assembly to determine a trend, which may be used to predict the remaining operative life of the air treatment assembly.

Embodiments of the present disclosure may be used to monitor one or more air treatment assemblies of a vehicle, such as an aircraft. Alternatively, embodiments of the present disclosure may be used with various other vehicles, such as automobiles, boats, trains, and the like. Also, alternatively, embodiments of the present disclosure may be used with fixed structures, instead of vehicles. For example, embodiments of the present disclosure may be used to monitor air treatment assemblies within residential or commercial buildings.

Embodiments of the present disclosure provide systems and methods that monitor the operative health of one or more air treatment assemblies, such as those within an aircraft. Embodiments of the present disclosure provide systems and methods that are configured to predict when an air treatment assembly will fail. In general, various air treatment assemblies, such as heat exchangers, gradually degrade over time as air flow passages therein fill with contaminants. By detecting attributes of air upstream and downstream of air treatment assemblies, embodiments of the present disclosure are able to determine the operative health, status, or other such state of the air treatment assemblies.

Figure 7:
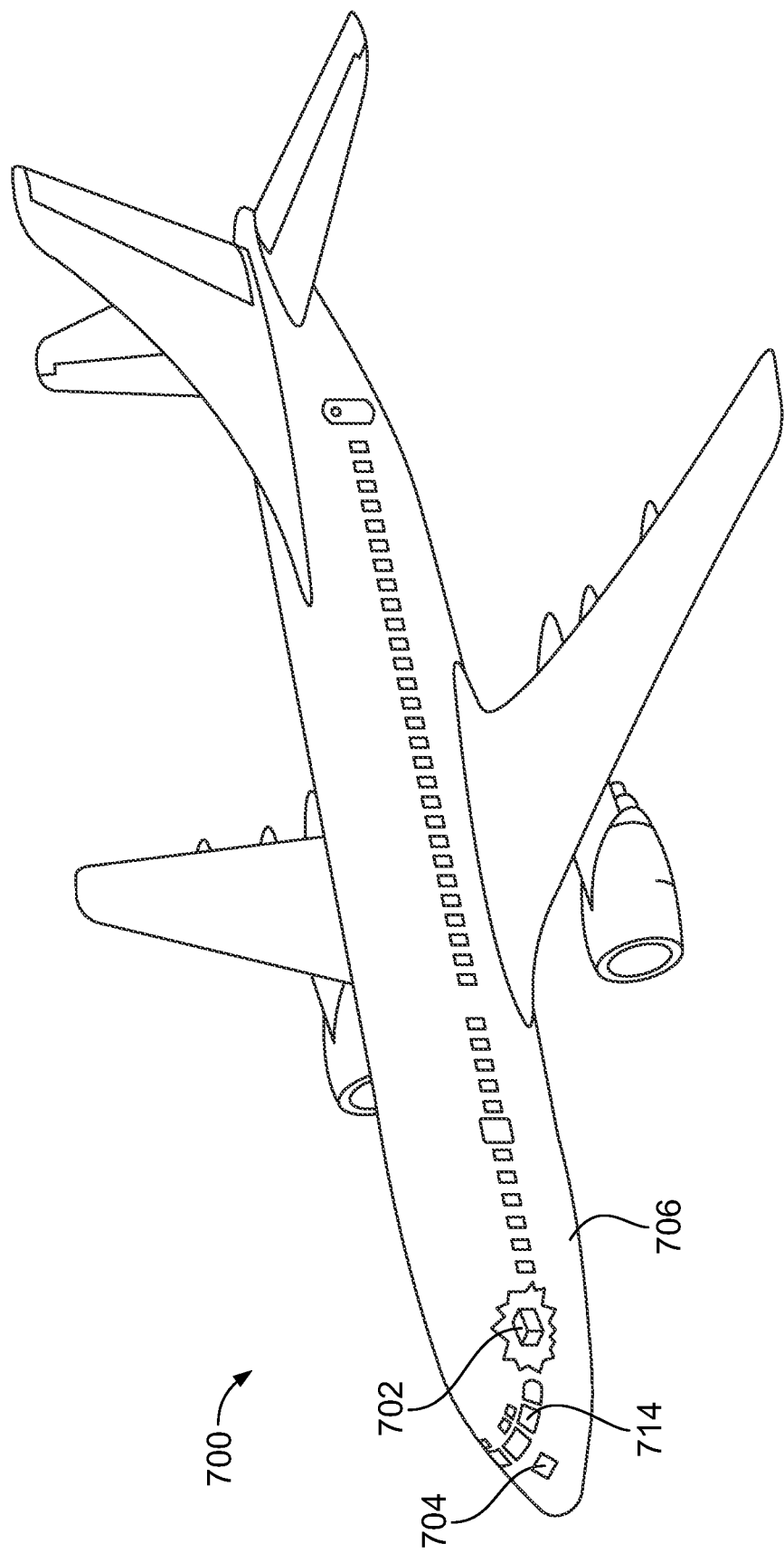
FIG. 7 illustrates a perspective view of an aircraft, according to an embodiment of the present disclosure.

FIG. 7 illustrates a perspective view of an aircraft 700 having a cabin 714, according to an embodiment of the present disclosure. The aircraft 700 is an example of a vehicle that includes an environmental control system (ECS) 702 having one or more air treatment assemblies that may be monitored by an air treatment monitoring system 704. The aircraft 700 includes a fuselage 706. The air treatment monitoring system 704 may be positioned within the aircraft 700 The air treatment monitoring system 704 may be in communication with one or more sensors positioned in relation to one or more air treatment assemblies of the ECS 702. Alternatively, the air treatment monitoring system 704 may be remotely located from the aircraft 700.

Embodiments of the present disclosure provide systems and methods that allow large amounts of data to be quickly and efficiently analyzed by a computing device. For example, an aircraft may include one or more air treatment assemblies that operate over long periods of time, such as before, during, and after a flight. During this time, the air treatment assemblies may be continually monitored by the air treatment monitoring system, or data may be stored and analyzed by the air treatment monitoring system at a later time. In either case, the amount of data is far too large for a human to accurately and efficiently manage and analyze.

Instead, the vast amounts of data are efficiently and accurately managed and analyzed by an air treatment monitoring system, as described above.

As used herein, the term "computer," "control unit," "module," or the like may include any processor-based or microprocessor-based system including systems using microcontrollers, reduced instruction set computers (RISC), application specific integrated circuits (ASICs), logic circuits, and any other circuit or processor capable of executing the functions described herein. The above examples are exemplary only, and are thus not intended to limit in any way the definition and/or meaning of the term "computer," "control unit," or "module."

The computer or processor executes a set of instructions that are stored in one or more storage elements, in order to process data. The storage elements may also store data or other information as desired or needed. The storage element may be in the form of an information source or a physical memory element within a processing machine.

The set of instructions may include various commands that instruct the computer or processor as a processing machine to perform specific operations such as the methods and processes of the various embodiments of the subject matter described herein. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to user commands, or in response to results of previous processing, or in response to a request made by another processing machine.

The diagrams of embodiments herein may illustrate one or more control units or modules. It is to be understood that the control units or modules represent circuit modules that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the modules may represent processing circuitry such as one or more of a field programmable gate array (FPGA), application specific integrated circuit (ASIC), microprocessor(s), a quantum computing device, and/or the like. The circuit modules in various embodiments may be configured to execute one or more algorithms to perform functions described herein. The one or more algorithms may include aspects of embodiments disclosed herein, whether or not expressly identified in a flowchart or a method.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein. For example, a processing unit, processor, or computer that is "configured to" perform a task or operation may be understood as being particularly structured to perform the task or operation (e.g., having one or more programs or instructions stored thereon or used in conjunction therewith tailored or intended to perform the task or operation, and/or having an arrangement of processing circuitry tailored or intended to perform the task or operation) to perform the task or operation. For the purposes of clarity and the avoidance of doubt, a general purpose computer is not "configured to" perform a task or operation unless or until specifically programmed or structurally modified to perform the task or operation.

The above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended clauses, along with the full scope of equivalents to which such clauses are entitled. In the appended clauses, the terms "including" and "in which" are used as the plain-English equivalents of the respective terms "comprising" and "wherein." Moreover, in the following clauses, the terms "first," "second," and "third," etc. are used merely as labels, and are not intended to impose numerical requirements on their objects. Further, the limitations of the following clauses are not written in means-plus-function format and are not intended to be interpreted based on 35 U.S.C. § 112(f), unless and until such clause limitations expressly use the phrase "means for" followed by a statement of function void of further structure.

This written description uses examples to disclose several embodiments of the inventive subject matter and also to enable a person of ordinary skill in the art to practice the embodiments of the inventive subject matter, including making and using any devices or systems and performing any incorporated methods. The patentable scope of the inventive subject matter is defined by the clauses, and may include other examples that occur to those of ordinary skill in the art. Such other examples are intended to be within the scope of the clauses if they have structural elements that do not differ from the literal language of the clauses, or if they include equivalent structural elements with insubstantial differences from the literal languages of the clauses.

What is claimed is:

1. A system comprising:
   at least one air treatment assembly configured to deliver treated air to an enclosed space within a vehicle;
   at least one upstream sensor upstream from the at least one air treatment assembly, wherein the at least one upstream sensor comprises at least one upstream air pressure sensor;
   at least one downstream sensor downstream from the at least one air treatment assembly, wherein the at least one downstream sensor comprises at least one downstream air pressure sensor, wherein the at least one upstream sensor and the at least one downstream sensor are configured to detect at least one attribute of air, wherein the at least one attribute of air is air pressure; and
   an air treatment monitoring system in communication with the at least one upstream sensor and the at least one downstream sensor, wherein the air treatment monitoring system is configured to receive one or more sensor signals from the at least one upstream sensor and the at least one downstream sensor, and wherein the air treatment monitoring system is configured to calculate an attribute differential based on the one or more sensor signals, wherein the air treatment monitoring system comprises:
      a pressure differential calculation unit that is configured to calculate a pressure differential between the one or more sensor signals received from the at least one upstream sensor and the at least one downstream sensor;
      a parameter compensation factor determination unit that is configured to determine one or more parameter compensation factors related to the vehicle, wherein the one or more parameter compensation factors relate to altitude, speed, ambient temperature, fan state, fan door position, and position of the vehicle; and
   a compensated pressure calculation unit that is configured to calculate a compensated pressure differential based on the pressure differential and the one or more compensation factors.

2. The system of claim 1, wherein the air treatment monitoring system is configured to calculate a compensated pressure differential based on the attribute differential and one or more parameters related to the vehicle.

3. The system of claim 1, wherein the air treatment monitoring system is configured to determine an operative state of the at least one air treatment assembly by referencing a failure threshold in relation to the attribute differential.

4. The system of claim 1, wherein the air treatment monitoring system is configured to predict a time of failure of the at least one air treatment assembly based on historical data of the at least one air treatment assembly.

5. The system of claim 1, wherein the at least one air treatment assembly comprises a heat exchanger.

6. The system of claim 1, wherein the air treatment monitoring system further comprises a diagnostic unit that is configured to compare the compensated pressure differential with a failure threshold to determine an operative state of the air treatment assembly, wherein the failure threshold is a pressure drop of 5 psi, wherein when the diagnostic unit determines that compensated pressure differential is above the failure threshold comprising a pressure drop of 5 psi, the diagnostic unit sends an alert signal to cause a visual alert that to be shown on a display to an operator of the vehicle.

7. The system of claim 1, wherein the air treatment monitoring system further comprises a prediction unit that is configured to predict a failure date of the air treatment assembly by detecting a trend in stored compensated pressure differentials over time.

8. The system of claim 1, wherein the air treatment monitoring system is within the vehicle.

9. An air treatment monitoring system configured to monitor an operative state of an air treatment assembly within a vehicle, the air monitoring system comprising:
   a pressure differential calculation unit that is configured to calculate a pressure differential between a first sensor signal received from a first sensor that is upstream in relation to the air treatment assembly and a second sensor signal received from a second sensor that is downstream in relation to the air treatment assembly;
   a parameter compensation factor determination unit that is configured to determine one or more parameter compensation factors related to the vehicle, wherein the one or more parameter compensation factors relate to altitude, speed, ambient temperature, fan state, fan door position, and position of the vehicle; and
   a compensated pressure calculation unit that is configured to calculate a compensated pressure differential based on the pressure differential and the one or more compensation factors.

10. The air treatment monitoring system of claim 9, further comprising a diagnostic unit that is configured to compare the compensated pressure differential with a failure threshold to determine an operative state of the air treatment assembly, wherein the failure threshold is a pressure drop of 5 psi, wherein when the diagnostic unit determines that compensated pressure differential is above the failure threshold comprising a pressure drop of 5 psi, the diagnostic unit sends an alert signal to cause a visual alert that to be shown on a display to an operator of the vehicle.

11. The air treatment monitoring system of claim 9, further comprising a prediction unit that is configured to predict a failure date of the air treatment assembly by detecting a trend in stored compensated pressure differentials over time.

12. The system of claim 9, wherein the air treatment monitoring system is within the vehicle.

13. A system comprising:
   at least one air treatment assembly configured to deliver treated air to an enclosed space within a vehicle;
   at least one upstream sensor upstream from the at least one air treatment assembly, wherein the at least one upstream sensor comprises at least one upstream air pressure sensor;
   at least one downstream sensor downstream from the at least one air treatment assembly, wherein the at least one downstream sensor comprises at least one downstream air pressure sensor, wherein the at least one upstream sensor and the at least one downstream sensor are configured to detect at least one attribute of air, wherein the at least one attribute of air is air pressure; and
   an air treatment monitoring system in communication with the at least one upstream sensor and the at least one downstream sensor, wherein the air treatment monitoring system is configured to receive one or more sensor signals from the at least one upstream sensor and the at least one downstream sensor, and wherein the air treatment monitoring system is configured to calculate an attribute differential based on the one or more sensor signals, wherein the air treatment monitoring system comprises:
- a pressure differential calculation unit that is configured to calculate a pressure differential between the one or more sensor signals received from the at least one upstream sensor and the at least one downstream sensor;
- a parameter compensation factor determination unit that is configured to determine one or more parameter compensation factors related to the vehicle;
- a compensated pressure calculation unit that is configured to calculate a compensated pressure differential based on the pressure differential and the one or more compensation factors; and a diagnostic unit that is configured to compare the compensated pressure differential with a failure threshold to determine an operative state of the air treatment assembly, wherein the failure threshold is a pressure drop of 5 psi, wherein when the diagnostic unit determines that compensated pressure differential is above the failure threshold comprising a pressure drop of 5 psi, the diagnostic unit sends an alert signal to cause a visual alert that to be shown on a display to an operator of the vehicle.

14. The system of claim 13, wherein the air treatment monitoring system is configured to predict a time of failure of the at least one air treatment assembly based on historical data of the at least one air treatment assembly.

15. The system of claim 13, wherein the at least one air treatment assembly comprises a heat exchanger.

16. The system of claim 13, wherein the air treatment monitoring system further comprises a prediction unit that is configured to predict a failure date of the air treatment assembly by detecting a trend in stored compensated pressure differentials over time.

17. The system of claim 13, wherein the air treatment monitoring system is within the vehicle.

18. An air treatment monitoring system configured to monitor an operative state of an air treatment assembly within a vehicle, the air monitoring system comprising:
- a pressure differential calculation unit that is configured to calculate a pressure differential between a first sensor signal received from a first sensor that is upstream in relation to the air treatment assembly and a second sensor signal received from a second sensor that is downstream in relation to the air treatment assembly;
- a parameter compensation factor determination unit that is configured to determine one or more parameter compensation factors related to the vehicle;
- a compensated pressure calculation unit that is configured to calculate a compensated pressure differential based on the pressure differential and the one or more compensation factors; and a diagnostic unit that is configured to compare the compensated pressure differential with a failure threshold to determine an operative state of the air treatment assembly, wherein the failure threshold is a pressure drop of 5 psi, wherein when the diagnostic unit determines that compensated pressure differential is above the failure threshold comprising a pressure drop of 5 psi, the diagnostic unit sends an alert signal to cause a visual alert that to be shown on a display to an operator of the vehicle.

19. The air treatment monitoring system of claim 18, further comprising a prediction unit that is configured to predict a failure date of the air treatment assembly by detecting a trend in stored compensated pressure differentials over time.

20. The air treatment monitoring system of claim 18, wherein the air treatment monitoring system is within the vehicle.

\* \* \* \* \*